(No Model.) 2 Sheets—Sheet 1.

J. MURPHY, O. F. ENGWALL & C. A. TIDEN.
OPERA GLASSES.

No. 539,006. Patented May 7, 1895.

Witnesses:
R. J. Jacker.
Flora L. Brown.

Inventors:
Jeremiah Murphy, Oscar F. Engwall and Charles A. Tiden,
By Charles Turner Brown, Atty.

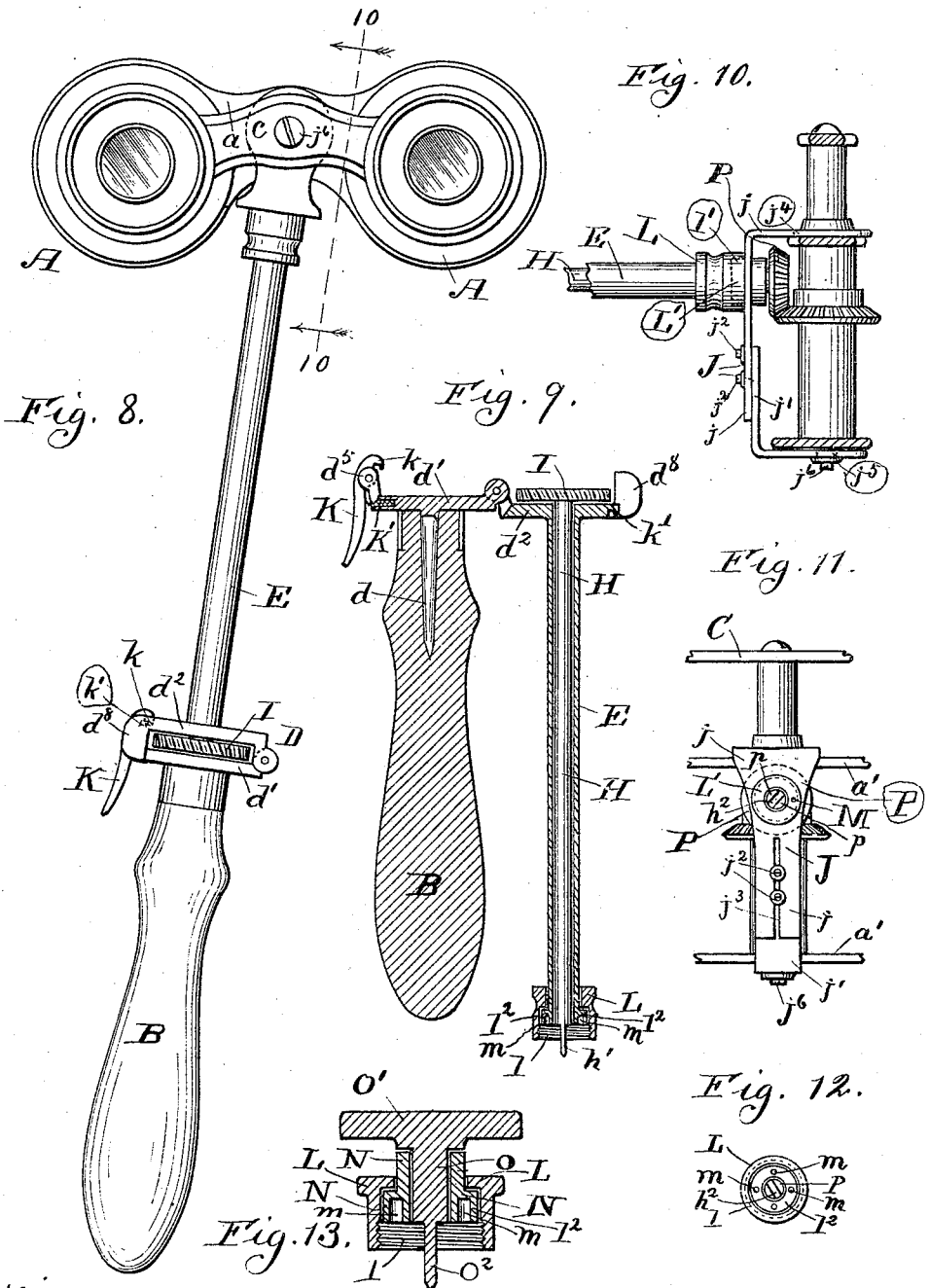

UNITED STATES PATENT OFFICE.

JEREMIAH MURPHY, OSCAR F. ENGWALL, AND CHARLES A. TIDEN, OF CHICAGO, ILLINOIS.

OPERA-GLASS.

SPECIFICATION forming part of Letters Patent No. 539,006, dated May 7, 1895.

Application filed October 12, 1894. Serial No. 525,714. (No model.)

*To all whom it may concern:*

Be it known that we, JEREMIAH MURPHY, OSCAR F. ENGWALL, and CHARLES A. TIDEN, residents of Chicago, in the county of Cook and State of Illinois, have invented certain new and useful Improvements in Opera-Glasses, of which this specification, reference being had to the drawings accompanying and forming a part hereof, is a full and complete description, sufficient to enable those skilled in the art to which it pertains to understand, make, and use the same.

The invention relates to opera glasses having holders attached thereto by means of which the glasses can be held for use, and focused by the hand grasping the handle of the holder; and the object of the invention is to obtain an opera glass of more sightly appearance than has been heretofore made, and of lighter construction; to obtain an opera glass having a holder of the kind described, the holder whereof can be easily detached from the glass by the person using the same, for placing such glass and holder in the respective cases therefor, and to obtain an opera glass having a holder of the kind named, the holder whereof, when detached, can be folded and thereby reduced in length, before being placed in the case therefor.
A further, and comparatively important part of the several objects sought in this invention is, the obtaining of a holder of the kind named which can be attached to opera glasses not originally designed to have a holder attached thereto in such manner that the appearance of the glass and holder shall be that of a new article, and not that of an article repaired or added to; and it is still further the object of the invention to obtain an opera glass and holder of the kind named wherein the movable parts or gearing shall be inclosed in such manner as to be protected from injury, as well as concealed from observation, leaving only the thumb wheel by which the glass is focused open to view and touch.

We are aware of the patent issued October 3, 1893, to Jeremiah Murphy, who is one of the inventors jointly interested herein, for an opera glass holder; and the improved opera glass obtained by us is the result of efforts to render the invention therein described of greater practical utility than it would otherwise be.

In the carrying out of our invention we have found it necessary to devise and construct mechanisms which are, by us, substituted for the mechanisms heretofore placed between the barrels of the opera glass for focusing the same; to devise and construct mechanisms for attaching the holder to the opera glass so that such holder can be detached from the opera glass by the person using the same; and at the same time so construct such holder and opera glass that the gearing contained therein respectively, shall intermesh or engage, and that without requiring special care or effort on the part of such person, and to devise and construct mechanisms whereby the holder can be, when detached from the opera glass, shortened, that is, reduced in length.

By making the holder detachable from the opera glass and so constructing such holder that after being so detached, it can be shortened, such opera glass and holder can be readily placed in the case provided therefor and such case is not required to be noticeably larger than would be a case adapted to hold the opera glass without such holder.

In the drawings referred to, Figure 1 is a front or end elevation of an opera-glass and holder embodying the invention; Fig. 2, a section through the center of the holder, with such holder removed from the opera-glass and folded in readiness to be placed in its case; Fig. 3, a sectional view on line 3 3 of Fig. 1, viewed in the direction indicated by the arrows, with the side barrels of the opera-glass (which barrels are in no way directly affected by the invention) removed; Fig. 4, a sectional view on line 4 4 of Fig. 3, viewed in the direction indicated by the arrows; Fig. 5, a bottom plan view of the parts illustrated in section in Fig. 3; Fig. 6, a section on line 6 of Fig. 1, viewed in the direction indicated by the arrow; Fig. 7, a top plan view of the upper end of the holder, showing the part thereof fitting onto the parts illustrated in Fig. 5. Fig. 8 is a front or end elevation of a modified construction of an opera-glass and holder embodying the invention; Fig. 9, a sectional view of the holder illustrated in Fig. 8, such holder being removed from the opera-glass and folded for packing in the case designed therefor; Fig. 10, a section on line 10 10 of Fig. 8, viewed in the direction indicated by the arrows; Fig. 11, a bottom plan view of the central part or portion illustrated in Fig. 10; Fig. 12, a top plan view of the upper end of the holder, at the point thereof, fitting onto the parts illustrated in Fig. 11. Fig. 13 is a vertical sectional view of a detachable thumb-wheel which can be substituted for the holder when desired.

A reference letter employed to indicate a given part is used to designate such part in all the views thereof wherever the same appears throughout the several figures of the drawings.

A is an opera glass, $a\ a$ being the respective barrels thereof and $a'\ a'$ the bars forming part of the frame-work of the opera glass and connecting such barrels together.

B is the handle of the holder.

D is a yoke connecting handle B with tube E. Yoke D consists of the part $d$ designed to be rigidly attached to handle B; the body parts $d'\ d^2$ pivotally joined together at one end thereof and adapted to be opened and closed on the connecting pivot, and when closed forming a yoke; and the part $d^3$ rigidly secured to the tube E, and catch $d^4$. What we deem the preferable construction of catch $d^4$ is illustrated in Figs. 1 and 6. In this construction $d^5$ is an abutment on part $d'$ of yoke D, and $d^6$ is a groove in abutment $d^5$.

$d^7$ is a stop on the side of abutment $d^5$.

$d^8\ d^8$ are abutments on part $d^2$, between which abutment $d^5$ extends when the holder it in operative adjustment.

$d^9$ is a thumb wheel rotatably mounted on part $d^2$ of the yoke and $d^{10}$ is the circular base of rotatable thumb wheel $d^9$.

$d^{11}$ is a notch in base $d^{10}$ of thumb wheel $d^9$, such notch corresponding with abutment $d^5$, so that when the notch is over the opening or space between abutments $d^8\ d^8$, such abutment $d^5$ can be extended through the notch with groove $d^6$ above part $d^2$ and in place so that rotation of the thumb wheel will cause flange or base $d^{10}$ to extend into the groove and so hold parts $d'\ d^2$ firmly together, thereby obtaining yoke D.

F is a sleeve rigidly secured to the upper end of tube E.

$f$ is a beveled flange on sleeve F.

$f'\ f'$ are circular notches in beveled flange $f$.

By reference to Fig. 7, it will be observed that the flange $f$ on one side of the circular notches $f'\ f'$ extend radially to a greater distance than on the other side of such notches.

$f^2\ f^2$ are abutments rigidly secured to the under side of frame F' of the opera glass.

The frame F' is secured at the ends thereof to the connecting bars $a'\ a'$, respectively, of the opera glass and is by us used as a substitute for the tube heretofore used. The respective abutments $f^2\ f^2$ are in form similar to the head of a common flat-headed screw, and in practice we prefer to employ screws to form such abutments. To attach the holder to frame F', it is merely necessary to place such holder so the abutments $f^2$ will extend through circular notches $f'\ f'$ and then to rotate the holder so that the beveled flange $f$ will come rigidly into place against the under faces adjacent thereto of the abutments $f^2\ f^2$. Because of the extension hereinbefore described of the flange $f$ on one side of the notches $f'\ f'$ further, radially, than on the other side of such notches the holder can be turned in one direction only when in position against frame F', as described, and an eccentric or cam-shape is thereby given to such beveled flange whereby by the turning of the holder, as described, a rigid connection between the holder and the frame F' is made.

$F^2$ is a passage-way extending through frame F'. $F^3$ is a bar secured at one end thereof to connecting-bar C, and extending into the passage-way $F^2$. The connecting bar C unites the tubes extending into the barrels $a\ a$ of the opera glass and is the connecting bar heretofore used for such purpose.

$F^4$ is a spring interposed between bar $F^3$ and frame F' in passage-way $F^2$, to produce slight frictional contact in the longitudinal movement of the tubes of the opera glass in barrels $a\ a$. While this spring $F^4$ is not essential to the working of the opera glass embodying our invention, yet such spring is by us deemed advantageous in that it prevents movement of the tubes in the barrels $a\ a$ when the holder is being attached to the opera glass.

$f^3$ is a geared pinion rotatably mounted in frame F' so as to engage or intermesh with the teeth $f^4\ f^4$ on bar $F^4$.

$f^5$ is a square hole extending through, or nearly so, the rotatable pinion $f^3$.

H is a rotatable spindle having the squared end $h$ at the upper end thereof fitting into the square hole $f^5$ of the rotatable pinion $f^3$ when the holder is in place against the frame F'. Rotation of the spindle H will, therefore produce rotation of pinion $f^3$ and through connecting bar $F^3$, and C, longitudinal movement of the tubes of the opera glass in the barrels $a\ a$ thereof, thereby focusing the opera glass A by the rotation of the spindle H. Rotatable spindle H extends downward through the tube E and has placed thereon thumb-wheel I secured thereto to rotate therewith.

G G' are washers adapted to be secured to connecting bars $a'\ a'$. These washers G G' are designed to be ornamental in appearance, and, when the frame F', bar $F^3$ and rotatable pinion $f^3$ are substituted for the tube and rotatable spindle heretofore employed for focusing opera glasses, in an opera glass not originally designed to have this invention embodied therein, to cover the holes in connecting bars $a'\ a'$ formed for the reception of such tube. By this means any indication that the opera glass has been repaired or made over to embody the invention is obviated.

In the modified construction illustrated in Figs. 8 to 12, both inclusive, a different form of catch for holding the parts of the yoke in a closed position is shown, a frame-work designed to be attached to an ordinary opera glass without taking therefrom the adjusting devices heretofore employed for focusing the opera glass, and a different construction for securing the holder to such frame are illustrated. In this modified construction, the beveled gears secured on the sleeve or tube of the focusing mechanism of the opera glass and the intermeshing beveled gear, whereby focusing mechanism is actuated, shown and described in Patent No. 506,012, of October 3, 1893, hereinbefore referred to is retained; but in this construction such driving beveled gear is rotatably mounted in frame-work J and not on the end of the spindle extending through the tube of the holder. Frame-work J consists of parts $j$ $j'$ secured together by screws $j^2$ $j^2$. This frame-work is thereby rendered adjustable to different sizes of opera glasses.

$j^3$ is a slot in part $j$ through which such screws extend.

In order to make the holder adapted to be held in the right hand or in the left, as preferred, the parts $j, j'$, are turned up, respectively, and on the upturned ends holes fitting over the ends of the focusing tube of the glass, or over screws extending into the ends thereof, are placed.

$j^4$ is a hole in the upturned end of part $j$, and fitting over the end of the focusing tube, and $j^5$ is a hole in the upturned end of part $j'$ through which screw $j^6$ fitting into the end of such focusing tube, extends.

The catch here used for holding the parts $d'$ $d^2$ of the yoke D together consists simply of the spring lever K pivoted in abutment $d^5$ so as to extend between abutments $d^8$ $d^8$ and engage at the hooked end $k$ thereof with projection $k'$ extending between such abutments $d^8$ $d^8$.

K' is the spring yieldingly holding spring lever K in engagement with projection $k'$.

The construction by which the holder is attached to the opera glass in Figs. 8 to 12 consists of the rotatable and longitudinally movable sleeve L mounted on tube E and having internal screw-threads $l$ adapted to engage with screw-thread $l'$ on projection L' of frame J.

$l^2$ is a flange on tube E preventing the sleeve L from being removed or coming off of the tube E, and against which flange such sleeve is brought in close contact by the engagement of the screw-threads $l$ $l'$.

M is a projection on the projection L' of frame J adapted to fit into the corresponding hole $m$ in the end of the tube E of the holder and thereby prevent rotation of such holder when the spindle H thereof is turned to focus the opera glass. More than one hole $m$ may be placed in such tube E, (or in ferrule F thereon,) to enable the person using the opera glass and holder to readily attach the holder and glass together.

$h'$ is the squared or rectangular end of spindle H, and $h^2$ is a corresponding groove or hole in the hub $p$ of the rotatably mounted beveled gear P.

The construction illustrated in Fig. 13 consists, simply, of the non-rotatable sleeve N, attached to the frame extending between the bars $a'$, $a'$, as hereinbefore described, and the rotatable spindle O, having thumb wheel O' at one end thereof and square (or rectangular) end $O^2$ at the other end thereof fitting into the square (or rectangular) hole $f^5$ of the rotatable pinion $f^3$.

The fastening illustrated and hereinbefore described consisting of the beveled flange F, having openings $f'$, $f'$ and abutments $f^2, f^2$, may be substituted for the sleeve L, having holes $m$, $m$, therein, shown in Fig. 13, if preferred.

Having thus described our invention, what we claim as new, and desire to secure by Letters Patent of the United States, is—

1. In an opera glass holder consisting of a cylindrical body part and a handle, a yoke joining the handle and body part, such yoke consisting of bars connected together at one end by a pivot and at the other end by a catch, whereby the yoke can be separated and the handle and body part folded; a spindle rotatably mounted in the cylindrical body part of the handle, a connection between the spindle and the focusing mechanism of the opera glass, and a thumb wheel on the spindle at the end thereof extending into the yoke substantially as described.

2. In an opera glass holder consisting of a cylindrical body part and a handle, a spindle rotatably mounted in the body part of the holder, the end of such spindle adjacent to the opera glass when the holder is joined thereto engaging with the driving mechanism of the focusing apparatus of such opera glass, and means for attaching the holder to the opera glass, such means consisting of a beveled flange having openings therein secured on the end of the body part of the holder, and abutments on the opera glass passing through such openings and fitting over the beveled flange when the holder is rotated into position; substantially as described.

3. In an opera glass, a bar extending between the bars connecting the barrels of the opera glass, washers fitting over the ends of the bar and to the connecting bars, a passage way in the first named bar, a bar fitting movably in the passage way, a geared rack on the last named bar, a rotatably mounted geared pinion mounted on the first named bar engaging with the geared rack, and a holder removably attached to the first named bar, such holder consisting of a body part and a handle joined together by a separable yoke, a rotatable spindle in the body part engaging with the rotatable pinion when the holder and the opera glass are joined together, and a thumb wheel on the spindle within the yoke; substantially as described.

4. In an opera glass, a bar extending between the bars connecting the barrels of the opera glass, a passage way in the first named bar, a bar fitting movably in the passage way, a geared rack on the last named bar, a rotatably mounted pinion engaging with the geared rack mounted on the first named bar, a spring in the passage way abutting against the bars a cylindrical sleeve, a spindle rotatably mounted in the sleeve, a thumb wheel on the spindle and an engagement between the spindle and rotatable pinion, and means for removably attaching the sleeve to the first named bar; substantially as described.

5. In an opera glass, a frame extending between the bars connecting the barrels of the opera glass and attachable to such bars, a geared pinion forming a driving gear rotatably mounted on the frame, a connection between such geared pinion and the extensible tubes of the opera glass, and a holder removably attached to such frame, such holder having a rotatable spindle therein engaging with the rotatable pinion when the holder and frame are joined together, a thumb wheel on the spindle and a yoke composed of separable bars extending around the thumb wheel and connecting the handle and the body part of the holder together; substantially as described.

6. In an opera glass, a holder consisting of a handle and a cylindrical body part, a separable yoke connecting such handle and body part together, a rotatable spindle mounted in the holder, a thumb wheel on the spindle and within the yoke, and means for attaching the holder to the frame of the opera glass extending between the bars connecting the barrels thereof, with a connection between the ends of such rotatable spindle and the focusing mechanism of the opera glass; substantially as described.

7. In an opera glass holder a rotatable spindle, a cylindrical body part in which the spindle is mounted, a handle, a yoke between the handle and the body part, a thumb wheel on the spindle within such yoke, a beveled flange on the end of the body part, said flange having portions thereof cut away, and abutments on the bar of an opera glass between the barrels thereof, such abutments extensible through the openings formed therefor by the cutting away of the portions of the beveled flange and fitting against the beveled flange when the body part of the holder is turned into position; substantially as described.

8. In an opera glass holder, a rotatable spindle, a cylindrical body part within which the spindle is mounted, a handle, a yoke between the handle and the body part, such yoke consisting of bars connected together by a pivot at one end thereof and by a catch at the other end, a thumb wheel on the spindle and within such yoke, and means for attaching the holder to the frame extending between the bars connecting the barrels of the opera glass, a squared end on the spindle engaging with a rotatable pinion in the frame, and a connection between the rotatable pinion and the focusing mechanism of the opera glass; substantially as described.

9. In an opera glass a frame extending between the bars connecting the barrels of the opera glass, such frame having a passage-way therein, a bar connected at one end thereof to the bar connecting the tubes of the opera glass and longitudinally movable in the passage-way, a geared rack on such longitudinally movable bar, a geared rotatable pinion mounted in the first named frame to engage with the geared rack, and a holder attachable to such frame, such holder having a rotatable spindle therein engaging with the rotatable pinion when the holder and opera glass are joined together; and a thumb wheel thereon midway of the handle, whereby it can be rotated by the thumb and forefinger of the hand grasping the handle, substantially as described.

10. In an opera glass a frame extending between the bars connecting the barrels of the opera glass, such frame having a passage way therein, a bar connected at one end thereof to the bar connecting the tubes of the opera glass and longitudinally movable in the passage way, a geared rack on such longitudinally movable bar, a geared rotatable pinion mounted in the first named frame to engage with the geared rack, a spring abutting against the first named frame and against the bar longitudinally movable therein, a holder and mechanism in the holder for turning the pinion contained in the frame, the driving wheel of such mechanism being midway of the two ends of the holder; substantially as described.

JEREMIAH MURPHY.
OSCAR F. ENGWALL.
CHARLES A. TIDEN.

In presence of—
FLORA L. BROWN,
CHARLES TURNER BROWN.